United States Patent [19]

Large et al.

[11] Patent Number: 4,796,691

[45] Date of Patent: Jan. 10, 1989

[54] FLUIDIZED BED HEAT EXCHANGE APPARATUS

[75] Inventors: Jean-Francois Large, Compiegne; Pierre F. Guigon, Le Meux, both of France

[73] Assignee: Charbonnages de France, Paris, France

[21] Appl. No.: 73,349

[22] Filed: Jul. 13, 1987

Related U.S. Application Data

[63] Continuation-in-part of Ser. No. 855,475, Apr. 24, 1986, abandoned.

[30] Foreign Application Priority Data

Apr. 24, 1985 [FR] France ............................ 85 06248

[51] Int. Cl.$^4$ ...................... F28D 19/02; F28D 13/00
[52] U.S. Cl. ......................... 165/104.16; 165/104.18; 34/57 A
[58] Field of Search ..................... 165/104.16, 104.18; 34/57 A

[56] References Cited

U.S. PATENT DOCUMENTS

| | | |
|---|---|---|
| 3,242,974 | 3/1966 | Goulounes . |
| 3,921,590 | 11/1975 | Mitchell et al. ............... 165/104.18 |
| 4,343,352 | 8/1982 | Bockman et al. .............. 165/104.16 |
| 4,449,575 | 5/1984 | Laws et al. ..................... 165/104.16 |

FOREIGN PATENT DOCUMENTS

| | | |
|---|---|---|
| 0095427 | 11/1983 | European Pat. Off. . |
| 1128881 | 1/1957 | France . |
| 2032925 | 11/1970 | France . |
| 1395900 | 5/1975 | United Kingdom . |
| 1439457 | 6/1976 | United Kingdom . |
| 2105455 | 3/1983 | United Kingdom . |

Primary Examiner—Albert W. Davis, Jr.
Attorney, Agent, or Firm—Cushman, Darby & Cushman

[57] ABSTRACT

A heat exchanger comprises two fluidization chambers separately supplied with fluidization gas. A heat transfer medium in the form of particulate material is supplied to the first chamber which is in communication with the second chamber. The second chamber has an outlet for discharging the heat transfer medium and contains a plurality of heat exchange tubes immersed in the fluidized bed therein. The particles of the heat transfer medium have average dimensions between 50 and 3,000 micrometers, and the maximum speed of the fluidizing gas in the second chamber is between 1.5 times and 10 times the minimum speed of fluidization of the particles of the heat transfer medium. Adjacent heat exchange tubes are arranged to be spaced by a horizontal distance which is between 1.4 times and 2.1 times the external diameter of these tubes. Additionally, the tubes have a vertical spacing between 1.4 and 2.1 times the external diameter of these tubes. By these means efficient heat exchange between the particulate material and a fluid flowed through the tubes is achieved.

4 Claims, 3 Drawing Sheets

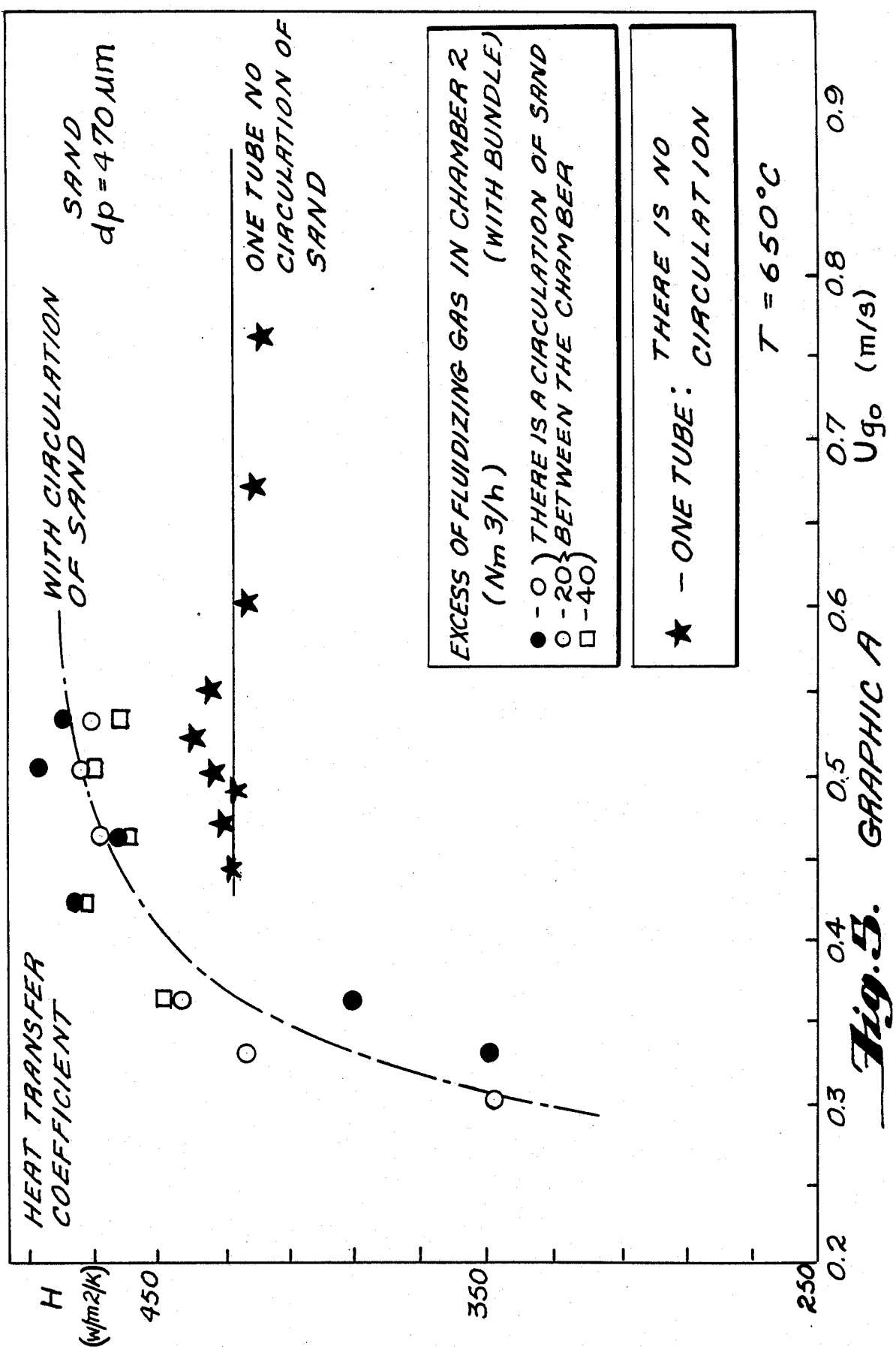

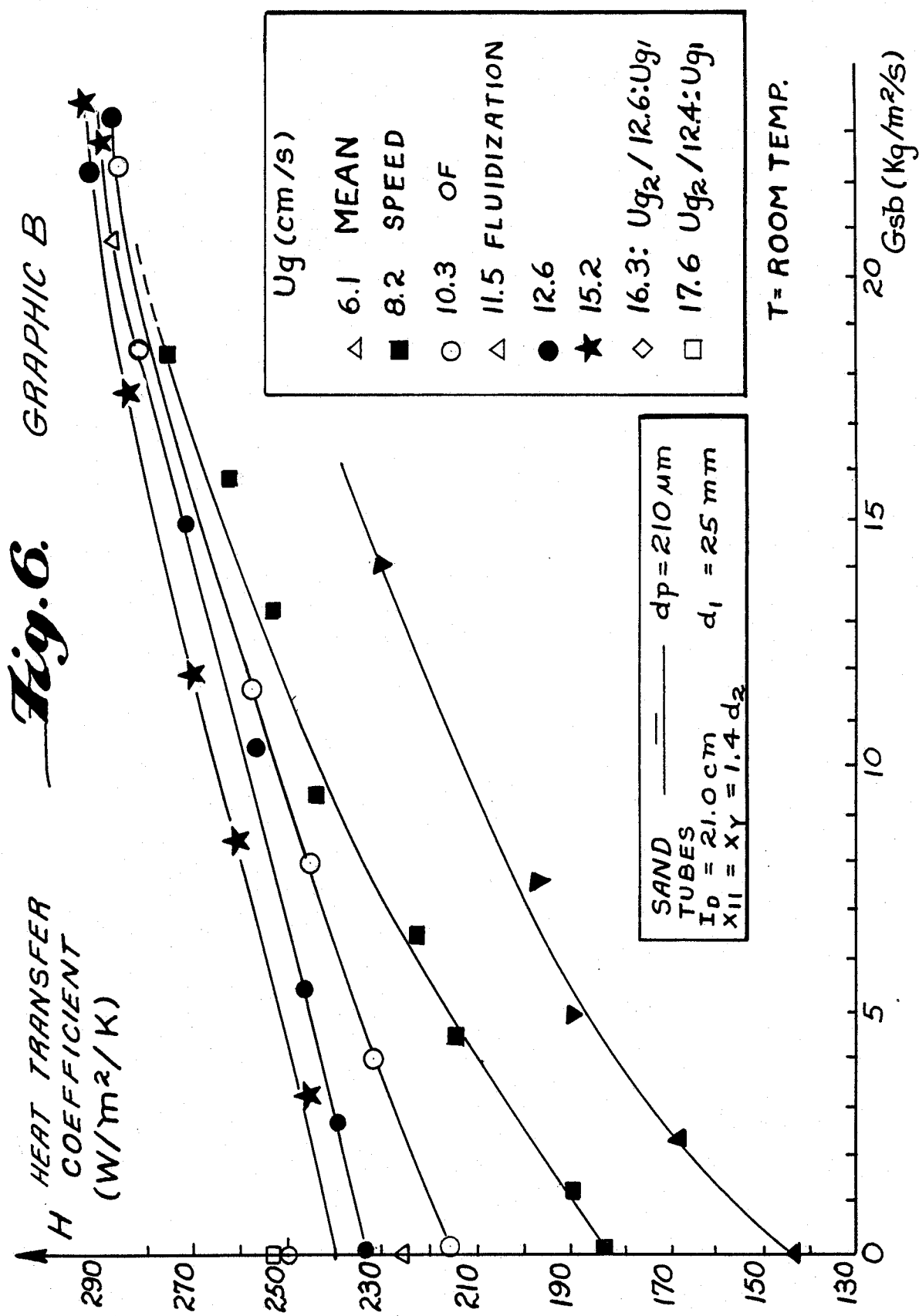

FLUIDIZED BED HEAT EXCHANGE APPARATUS

This is a continuation-in-part of application Ser. No. 855,475, filed Apr. 24, 1986, which was abandoned upon the filing hereof.

BACKGROUND TO THE INVENTION

The invention relates to a fluidized-bed heat exchange apparatus arranged, for example, to provide a heat exchange which can be regulated, with flexibility, for a flow of particulate material and powdery products which occurs during a heat treatment such as, the calcination of ores or the combustion of coal in a circulating bed.

It is desirable that a heat transfer, for example a heat recovery, is performed in a plant which is as compact as possible and which has as large a degree of operating flexibility as possible. These two conditions are not fulfilled in a satisfactory manner in the plants known hitherto. At present, conventional or multicellular fluidized beds are used, in which heat-exchange tubes are immersed. These apparatus are large in size and their thermal power varies only within a limited range, in stages and in a discontinuous manner. Mobile, aerated or non-aerated beds are also used, in which heat-exchange tubes are immersed. The operation of these beds cannot be easily controlled because of the poor distribution of the solids, and their efficiency is mediocre.

It is an object of the invention to provide a heat exchanger able to provide improved efficiency heat exchange between a charge of particulate material in the fluidized state and heat exchange tubes immersed in the fluidized bed.

The invention also seeks to enable the heat transfer between the powdery products and the heat-exchange tubes to be continuously regulated.

SUMMARY OF THE INVENTION

According to the present invention, there is provided heat exchange apparatus comprising a first fluidization chamber, first gas supply means for supplying fluidizing gas to said first fluidization chamber, and means for feeding particulate material to said first fluidization chamber, said particulate material having average dimensions of between 50 and 3000 micrometres, and a second fluidization chamber, second gas supply means for supplying fluidizing gas to said second fluidization chamber, and discharge means through which the particulate material can be discharged from said second fluidization chamber, and means providing communication between said first and second fluidization chambers, the maximum speed of the fluidizing gas in said second chamber being arranged to be between 1.5 times and 10 times the minimum fluidization speed of the particulate material, the apparatus further comprising a bundle of heat exchange tubes received within the second fluidization chamber, adjacent heat exchange tubes being horizontally spaced by a distance between 1.2 times and 3 times their external diameter.

The horizontal spacing distance is generally the distance between the axes of two neighbouring tubes, measured in a horizontal plane.

Generally, the tubes have parts of their length which are separated by a vertical distance, and their vertical separation, or the vertical distance between the axes of two neighbouring tubes measured in a vertical plane, is between 1.2 and 3 times the external diameter of these tubes.

Preferably, the particles have average dimensions chosen so as to be between 100 and 2,000 micrometres and the maximum speed of the fluidizing gas is chosen to be between 6 and 9 times the minimum fluidization speed of these particles. A preferred value for the horizontal separation is 1.5 times the external diameter of the tubes and a preferred value for the vertical separation is also 1.5 times their external diameter.

An important characteristic feature of heat exchange apparatus of the invention is the compactness of the bundle of tubes within the second fluidization chamber, a compactness which is expressed by the distances defined above and which means that this second chamber is filled in all of its efficient part with tubes arranged at the distances indicated.

When the compactness of the tube bundle reaches the critical compactness defined above, there occurs, all other things being equal, a difference in the average density of the fluidized beds within the two chambers. This density is slightly less than in the second chamber, thereby causing a flow of heat transfer medium between the two chambers, from the first one to the second one. Moreover, because of the compactness of the tubes, greater friction occurs between the solid particles and the heat-exchange tubes. The two effects (reduced density promoting flow and greater friction against the tubes limiting flow) are in opposition and lead to a resultant rate of flow which has the effect of improving the heat transfer between the fluidized medium and the tubes. This phenomenon occurs even when the fluidization speeds are identical in each of the two chambers. However, it is obvious that the flow inside the second chamber is also affected by the flow rate of the fluidising gas inside the latter or, in other words, by the relative values of the flow rates of the fluidizing gases in the first and in the second chamber. Thus, while retaining the advantage of an improved transfer coefficient, it is possible to modulate the power of the heat exchange of which the exchanger according to the invention is capable, by varying the fluidization speed in each of the two chambers.

The means for supplying the heat transfer medium to the first chamber may consist of a downwardly extending tube immersed in the fluidized bed, in the case where it is required to provide pneumatic isolation between the heat exchanger and the separator located upstream.

The discharge outlet of the second fluidization chamber may be an overflow outlet which emerges externally or, by way of a variation, inside the first chamber at a level higher than the level of the fluidized bed contained in the first chamber.

According to another embodiment, the first and second fluidization chambers are contained inside a common general casing and are separated by an internal partition, the height of which is less than that of the fluidized bed.

In this case, the fluidizing gases are advantageously removed via the overflow outlets emerging from either chamber. However, if required, the fluidising gases may be removed, out of each chamber, via special outlets provided for this purpose or via overflows, provided that there is an upper partition, the bottom of which is immersed in the fluidized bed. It is also possible to provide a special outlet for discharging the gases from the first chamber and for removing the gases together with the solids from the second chamber.

If it is required to improve further the flexibility of the apparatus, it is possible to position a mechanical or non-mechanical valve in the means communicating the two chambers to modulate the rate of flow of the solids between the two chambers. The valves effect is superimposed on that caused by the relative flow rate of the fluidizing gases inside the first and second chambers. In practice, it is possible to use the valve as a sole regulating means, keeping the fluidization flow rates constant. It is also possible to modulate the power each time the valve is adjusted, by varying the fluidization flow rates. It is also possible to use the two regulating means simultaneously.

BRIEF DESCRIPTION OF THE DRAWINGS

Embodiments of the present invention will hereinafter be described, by way of example, with reference to the accompanying drawings, in which:

FIGS. 5 and 6 are graphic illustrations of test results showing, respectively, the improvement in the heat transfer coefficient and the dependence of the coefficient upon rate of flow of the circulating fluidized sand.

DESCRIPTION OF PREFERRED EMBODIMENTS

Figure 1:
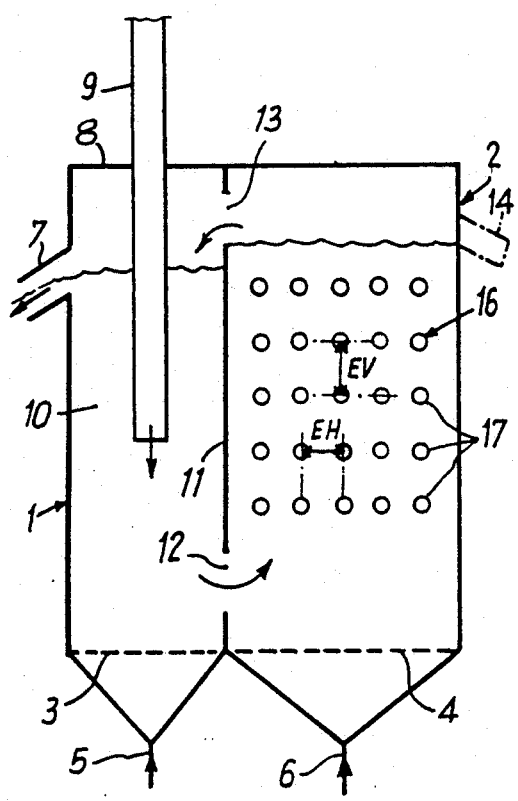
FIG. 1 shows schematically a first embodiment of a heat recovery exchanger of the invention.
Figure 2:
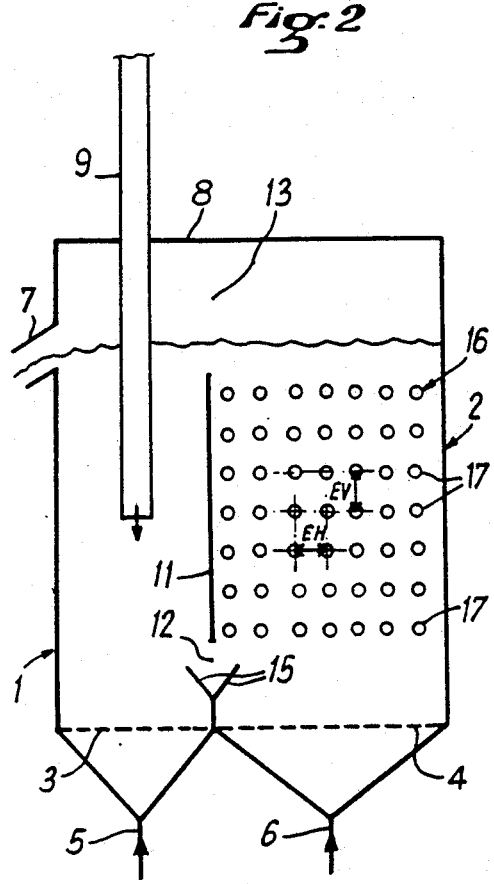
FIG. 2 shows schematically a second embodiment of a heat recovery exchanger of the invention.

FIGS. 1 and 2 show examples of a heat exchanger of the invention which comprises a first fluidization chamber 1 attached to and communicating with a second fluidization chamber 2. These two chambers 1, 2 each have a respective grid 3, 4, and a respective fluidizing gas inlet 5, 6 so that the contents of each chamber 1 or 2 can be fluidized separately. At its top, the chamber 1 has a downwardly extending overflow discharge tube 7. This chamber 1 also has an upper closure wall 8 through which a downwardly extending tube 9 passes to supply a calorie-bearing heat transfer medium in particular form from, for example, a separator such as a cyclone following receiving an output from a processing reactor or a fluidized-bed boiler. The tube 9 is immersed in the fluidized bed 10, the normal level of which is that of the overflow tube 7. The immersion of the tube 9 in the bed 10 is arranged to ensure pneumatic isolation of the heat exchanger relative to the separator located upstream.

The chamber 2 is separated from the chamber 1 by a wall 11 which has a lower opening 12 connecting the two chambers and an upper opening 13 also connecting the two chambers. The examples shown in FIGS. 1 and 2 differ in that, in FIG. 1, the wall 11 is a common wall which completely separates the two chambers 1,2, except in the region of the openings 12 and 13, whilst, in FIG. 2, the wall 11 is an internal partition which delimits the two chambers 1,2 within the same volume. Thus, in the second case, the upper opening 13 is formed by an interruption in the wall 11 before it meets the common upper closure wall 8. In the example shown in FIG. 1, the two chambers 1, 2 are better isolated from each other. It would also be possible to replace or augment the upper opening 13 with an overflow tube 14 (indicated in dot-dash lines) forming part of the second chamber 2. Preferably the outlet 14 would be positioned at the same level or at a slightly higher level than that of the outlet 7. This configuration has the advantage that the fluidizing gases of the inlets 5 and 6 are separated except for the fraction which is carried along by the solids which pass through the opening 12, provided that the opening 13 is immersed in the fluidized bed. In the configuration shown in FIG. 2, an overflow outlet may be situated either on the left (at 7 as shown in FIG. 2) or on the right (as shown at 14, for example, in FIG. 1). The choice between these different configurations depends upon the conditions of use.

FIG. 2 illustrates that the lower opening 12 may be equipped, on its bottom edge, with V-shaped deflectors 15 which minimise the effect of the fluidising gas of one chamber on the bed in the other chamber. This arrangement may of course, also be adopted in the example shown in FIG. 1.

In both embodiments, a bundle of heat exchange tubes, generally indicated by the reference number 16, is installed within the second chamber 2, between the level of the lower opening 12 and that of the upper opening 13. A fluid which is to be heated by way of the heat transfer medium within the apparatus and supplied via the tube 9 can be flowed through the bundle 16. In other applications, a hot fluid can be flowed through the bundle 16 of tubes to heat the medium introduced via the tube 9 into the apparatus.

The heat exchanger 16 comprises a bundle of tubes 17 which are horizontal or which have at least a part of their length which extends horizontally or substantially horizontally. In any case, it is possible to define a horizontal distance or horizontal gap EH between the axes of the tubes in a horizontal plane. Similarly, the tubes 17 are arranged in tiers in the vertical direction, so that it is possible to define, between their axes, a vertical distance EV which separates the horizontal parts of these tubes.

Figure 3:
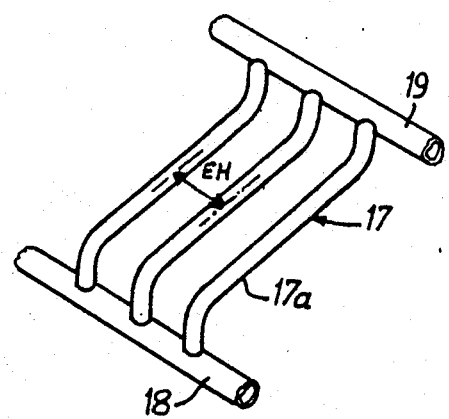
FIGS. 3 and 4 are detailed views showing examples of tube arrangements.
Figure 4:
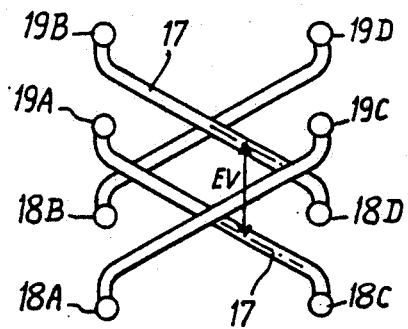

The word "bundle" is not meant to indicate that the tubes 17 are all between the two same headers. FIG. 3 shows one arrangement in which tubes 17 all connect a lower header 18 to an upper header 19 and all have a central part 17a which is inclined relative to the horizontal. These tubes 17 are separated by a horizontal distance EH. FIG. 4 shows an arrangement in which several lower headers 18A, 18B, 18C and 18D are arranged in tiers in the vertical direction on two opposed sides. These lower headers 18 are each connected by tubes 17, inclined as in FIG. 3, to a respective upper header 19A, 19B, 19C or 19D, which are also arranged in tiers on two opposed sides. Between these tubes, a vertical distance EV can be defined separating the axes of the tubes.

The word "bundle" is therefore used here to denote a set of tubes connecting two or more than two headers and arranged so that it is possible to define between them, a horizontal distance EH and a vertical distance EV. Totally vertical tubes within the chamber 2 would not satisfy this definition, but vertically tiered layers of tubes which are horizontal or, preferably, only inclined slightly to the horizontal would satisfy the definition. Inclination of the tubes relative to the horizontal is admissible so long as a vertical distance EV can be defined between the tubes.

The tubes 17 of the bundle 16 have, within the chamber 2, a compactness which is defined by the horizontal distance EH and by the vertical distance EV. In an actual example, the chamber 2 had the dimensions 0.40 m×0.30 m, giving the grid 4 an area of 0.12 m². The tubes 17 each had an external diameter of 25 mm, the horizontal distance EH was 37.5 mm, and the vertical distance EV was also 37.5 mm.

The compactness of the tubes 17 within the chamber 2 improves the heat transfer. This improvement can only be completely achieved when the particles of the heat transfer medium are of a given size which corresponds to a given speed of fluidising gas passing through the grid 4 into the chamber 2. In the example described above, the heat transfer medium was sand having an average grain diameter of 500 micrometres, with a relative density of 2.5. The maximum speed of the fluidising gas was 0.6 m/s. The throughput of the heat transfer medium inside the chamber 2 was seen to be 12 t/h; the temperature of the fluidized bed within said chamber was 600° C. and it was determined that the coefficient of transfer between the bed and the tubes was 300 W/m$^2$°C.

The chamber 2 has cross-sectional dimensions which are greater than those of the chamber 1. The difference between the dimensions of the two chambers is not of critical importance; it is sufficient that the chamber 1 is capable of suitably supplying the chamber 2 with heat transfer medium.

The heat transfer coefficient between the tubes 17 of the bundle 16 and the fluidized bed depends on the compactness of the tubes the effect of which is a circulation of the heat transfer medium between the chamber 1 and the chamber 2. With sand having an average grain diameter of 210 $\mu$m the values of the heat transfer coefficient were in the range of 140–230 W/m$^2$/K, at 40° C., when there was no circulation of the same between the chambers 1 and 2. An improvement better than 20% of said coefficient has been verified by the effect of the circulation of the fluidized sand between the chambers 1, 2, the chamber 2 having inside a bundle 16 of tubes 17 with horizontal distance EH and vertical distance EV being 1.5 times the external diameter of the tubes as in the specification of the application. With sand having an average grain diameter of 847 $\mu$m and 470 $\mu$m the verified values of heat transfer coefficient were 350 W/m$^2$/K and 470 W/m$^2$/K respectively, at 650° C. The effect of the compactness of the tubes is more noticeable on the graph A of FIG. 5 where the heat transfer coefficient H (W/M$^2$/K) is plotted as a function of the speed of circulation of the fluidized sand U go (m/s), with one tube only and with a bundle of tubes, at 650° C. On the graph B of FIG. 6, the heat transfer coefficient H (W/m$^2$/K) is plotted as a function of the rate of flow of the circulating fluidized sand Gsb (Kg/m$^2$/s) for several mean fluidization speeds (the distances EH and EV being 1.4 times the external diameter of the tubes).

Tests have shown that the favourable effect of the compactness of the tubes on the transfer coefficient is influenced more by the horizontal distance EH than by the vertical distance EV.

In addition to its improved transfer coefficient, a heat exchanger of the invention has a high degree of operational flexibility. The heat transfer can be regulated in a continuous manner between a zero value where fluidization is stopped within the chamber 2 and a maximum value where fluidization inside the chamber 2 occurs at the maximum speed of the fluidising gas. The compactness of the tubes 17 gives rise, within the chamber 2, to a difference in density between the fluidized beds of the two chambers. This difference becomes correspondingly greater as the speed of gas within the chamber 2 increases and as the average size of the particles increases. The density difference affects the rate of flow of the heat transfer medium between the chamber 1 and the chamber 2.

It is obvious that other embodiments of the invention are possible. For example, the chamber 2 could be annular and could surround the chamber 1. It must also be noted that the invention does not require a given arrangement of the tubes relative to each other, either in the same plane or in different planes, provided that the abovementioned spacing distances are respected. For example, tubes situated in different planes could be parallel or could be arranged in transverse directions or even in mutually perpendicular directions.

We claim:

1. Heat exchange apparatus comprising a first fluidization chamber, first gas supply means for supplying fluidizing gas to said first fluidization chamber, and means for feeding particulate material to said first fluidization chamber, said particulate material having average dimensions of between 50 and 3000 micrometers, and a second fluidization chamber, second gas supply means for supplying fluidizing gas to said second fluidization chamber, and discharge means through which the particulate material can be discharged from said second fluidization chamber, and means providing communication between said first and second fluidization chambers, the maximum speed of the fluidizing gas in said second chamber being arranged to be between 1.5 times and 10 times the minimum fluidization speed of the particulate material, the apparatus further comprising a plurality of spaced apart heat exchange tubes received within the second fluidization chamber, adjacent heat exchange tubes being horizontally spaced by a distance of between substantially 1.4 to 2.1 times the external diameter of said tubes and spaced by a vertical distance of between substantially 1.4 to 2.1 times the external diameter of said tubes, said distances between said tubes and said second chamber permitting a differential density to be achieved between said first and second chambers to thereby result in an improved heat transfer coefficient while permitting operational flexibility.

2. Apparatus according to claim 1, wherein the particles of the particulate material have dimensions of between 100 and 2000 micrometers.

3. Apparatus according to claim 1, wherein the particulate material is sand having a grain size of 500 micrometers and a relative density of 2.5, and the speed of the fluidizing gas is chosen to be between 0.45 m/s and 0.70 m/s.

4. Apparatus according to claim 1, wherein the horizontal spacing is substantially 1.5 times the external diameter of the tubes and the vertical distance is substantially 1.5 times the external diameter of the tubes.

* * * * *